(12) United States Patent
Lin

(10) Patent No.: US 11,762,621 B2
(45) Date of Patent: Sep. 19, 2023

(54) OBJECT MANAGEMENT METHOD AND MOBILE TERMINAL

(71) Applicant: VIVO MOBILE COMMUNICATION CO., LTD., Guangdong (CN)

(72) Inventor: Yuantao Lin, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/486,712

(22) Filed: Sep. 27, 2021

(65) Prior Publication Data
US 2022/0012003 A1 Jan. 13, 2022

Related U.S. Application Data

(63) Continuation of application No. PCT/CN2020/078866, filed on Mar. 11, 2020.

(30) Foreign Application Priority Data

Mar. 27, 2019 (CN) .......................... 201910237973.X

(51) Int. Cl.
*G06F 3/14* (2006.01)
*G06F 3/0483* (2013.01)
*G06F 3/0486* (2013.01)
*G06F 3/0488* (2022.01)
*H04W 88/02* (2009.01)

(52) U.S. Cl.
CPC .......... *G06F 3/1446* (2013.01); *G06F 3/0483* (2013.01); *G06F 3/0486* (2013.01); *G06F 3/0488* (2013.01); *H04W 88/02* (2013.01)

(58) Field of Classification Search
CPC .... G06F 3/1446; G06F 3/0483; G06F 3/0486; G06F 3/0488; H04W 88/02
See application file for complete search history.

(56) References Cited

U.S. PATENT DOCUMENTS

| 9,152,306 B2 * | 10/2015 | Anderson | G06F 3/0304 |
| 2010/0153513 A1 * | 6/2010 | Zahran | G06F 13/387 |
| | | | 709/212 |

(Continued)

FOREIGN PATENT DOCUMENTS

| CN | 101901071 A | 12/2010 |
| CN | 103729159 A | 4/2014 |

(Continued)

OTHER PUBLICATIONS

O'Reilly, "Opening Two Instances of File Explorer", ("O'Reilly")published on Sep. 20, 2018, URL=https://www.oreilly.com/library/view/windows-8-five/9781118462324/a23.html (Year: 2018).*

(Continued)

*Primary Examiner* — James T Tsai
(74) *Attorney, Agent, or Firm* — Maschoff Brennan

(57) ABSTRACT

An object management method and a mobile terminal are provided, where the method includes: receiving a first operation performed on a target object in a first page displayed on a first screen; and moving or copying, in response to the first operation, the target object into a second page displayed on a second screen, where the first page and the second page are different directory pages.

18 Claims, 8 Drawing Sheets

(56) References Cited

U.S. PATENT DOCUMENTS

| | | |
|---|---|---|
| 2010/0295802 A1 | 11/2010 | Lee |
| 2013/0321340 A1 | 12/2013 | Seo et al. |
| 2014/0101577 A1* | 4/2014 | Kwak ................... G06F 3/1431 |
| | | 715/761 |
| 2014/0344739 A1* | 11/2014 | Yoon ................... G06F 16/9562 |
| | | 715/769 |
| 2014/0351722 A1* | 11/2014 | Frederickson ........ G06F 3/0481 |
| | | 715/761 |
| 2017/0031928 A1* | 2/2017 | Koeninger ............ G06F 16/113 |
| 2018/0329667 A1* | 11/2018 | Sadak ................... G06F 9/5044 |

FOREIGN PATENT DOCUMENTS

| | | |
|---|---|---|
| CN | 105282315 A | 1/2016 |
| CN | 105867531 A | 8/2016 |
| CN | 110007835 A | 7/2019 |
| CN | 110231897 A | 9/2019 |
| CN | 110413168 A | 11/2019 |
| JP | 2013073528 A | 4/2013 |

OTHER PUBLICATIONS

Written Opinion and International Search Report in Application No. PCT/CN2020/078866 dated Oct. 7, 2021.

* cited by examiner

OBJECT MANAGEMENT METHOD AND MOBILE TERMINAL

CROSS-REFERENCE TO RELATED APPLICATION

This application is a continuation application of a PCT Application No. PCT/CN2020/078866 filed on Mar. 11, 2020, which claims priority to Chinese Patent Application No. 201910237973.X, filed on Mar. 27, 2019 in china, the disclosures of which is incorporated herein by reference in their entireties.

TECHNICAL FIELD

The present disclosure relates to the field of communications technologies, and in particular, to an object management method and a mobile terminal.

BACKGROUND

With the development of mobile communications technologies, memories of mobile terminals such as mobile phones become larger and larger, and quantities of files that can be stored in the memories are increasing. Therefore, people often need to manage files, folders, icons and other objects in mobile terminals, for example, move or copy an object in a page into another page.

In the related art, during object management, people often need to repeatedly switch between different pages. The following uses object management as an example. Generally, a solution in the related art is: in an object management application, select one or more files or folders from a certain directory, perform a copying or cutting operation, exit the current directory, enter a target directory into which the files or folders are expected to be placed, and finally, perform a pasting operation to place the selected files or folders into the target directory. When a file or folder needs to be copied into a plurality of directories, or files or folders in different directories need to be moved into a certain directory, users need to switch between different directories repeatedly to complete object management.

It can be learned that object management manners in the related art have problems of cumbersome operations and low management efficiency.

SUMMARY

Embodiments of the present disclosure provides an object management method and a mobile terminal.

The present disclosure is implemented as follows.

According to a first aspect, an embodiment of the present disclosure provides an object management method, applied to a mobile terminal, where the mobile terminal includes a first screen and a second screen, and the method includes:
receiving a first operation performed on a target object in a first page displayed on the first screen; and
moving or copying, in response to the first operation, the target object into a second page displayed on the second screen, where
the first page and the second page are different pages.

According to a second aspect, an embodiment of the present disclosure provides a mobile terminal, including a first screen and a second screen, and further including:
a first receiving module, configured to receive a first operation performed on a target object in a first page displayed on the first screen; and
a management module, configured to move or copy, in response to the first operation, the target object into a second page displayed on the second screen, where
the first page and the second page are different pages.

According to a third aspect, an embodiment of the present disclosure provides a mobile terminal, including a first screen and a second screen, and further including: a processor, a memory, and a computer program that is stored in the memory and that can be run on the processor, where when the computer program is executed by the processor, the steps of the foregoing object management method are implemented.

According to a fourth aspect, an embodiment of the present disclosure provides a computer-readable storage medium, storing a computer program, where when the computer program is executed by a processor, the steps of the foregoing object management method are implemented.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and those of ordinary skill in the art can still derive other drawings from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
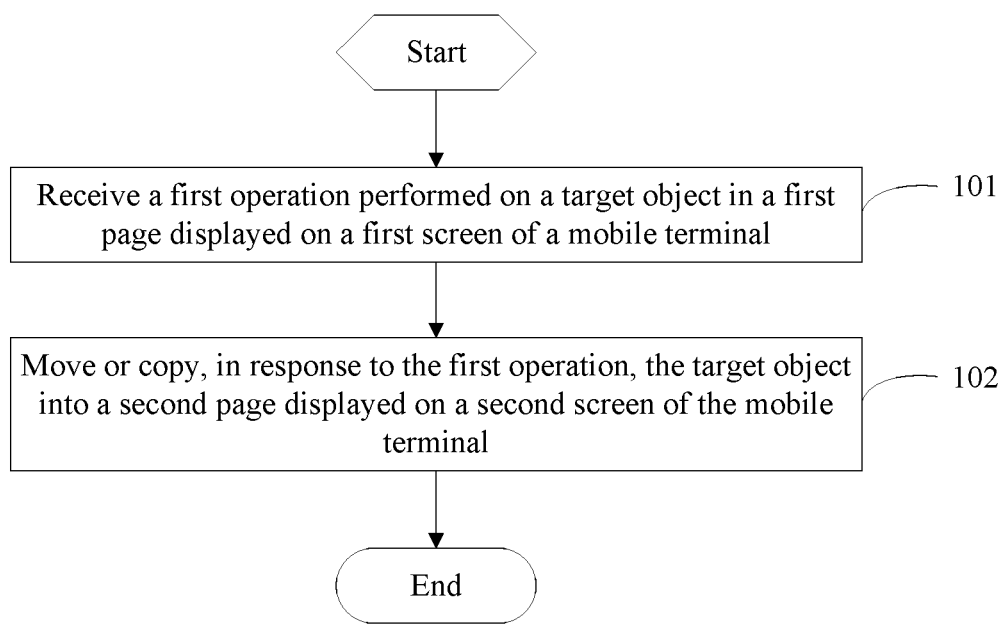
FIG. 1 is a flowchart of an object management method according to an embodiment of the present disclosure.

FIG. 1 is a flowchart of an object management method according to an embodiment of the present disclosure. The method is applied to a mobile terminal, and the mobile terminal includes a first screen and a second screen. As shown in FIG. 1, the method includes following steps.

Step 101: Receive a first operation performed on a target object in a first page displayed on the first screen of the mobile terminal.

The first page may be a desktop page into which a user expects the target object to be moved or copied, or a source-directory page where the target object is stored. The target object may be a file, a folder, or an icon in the first page. There may be one or more target objects, that is, a plurality of objects in the first page can be managed simultaneously.

The first operation may be an operation of triggering the target object to be moved or copied, for example, an operation of long pressing the target object and dragging the target object to a target position or area, or an operation of touching the target object and selecting a move option or copy option from pop-up menu options. Different first operations may be set to trigger the target object to be moved and copied respectively.

Step 102: Move or copy, in response to the first operation, the target object into a second page displayed on the second screen of the mobile terminal.

The first page and the second page are different pages.

The second page may be a target page into which the user expects the target object to be moved or copied. The first page and the second page may be different desktop pages of the mobile terminal or different file-directory pages. For example, the first page is the source-directory page, and the second page is a target-directory page.

For example, if the user expects a file in a first folder to be moved into a second folder, a directory page where the first folder is located is the first page, and a target page where the second folder is located is the second page. For another example, if the user expects an application icon on a first desktop page to be moved into a second desktop page, the first desktop page is the first page, and the second desktop page is the second page.

In this way, the user can manage an icon, a file, a folder, or the like on a desktop fast and conveniently by using the object management method.

In this embodiment, before the target object is moved or copied, the first page may be opened on the first screen, and the second page may be opened on the second screen.

Therefore, in this step, after the first operation performed on the target object in the first page is received, the target object can be moved or copied into the second page in response to the first operation, where after the target object is moved into the second page, only the second page includes the target object, while after the target object is copied into the second page, both the first page and the second page include the target object.

In this way, different screens of the mobile terminal display a page where an object that the user expects to manage is located, so that the user can manage the target object in the page, for example, move or copy the target object, without repeated switching between a plurality of pages.

In this embodiment, it should be noted that, the user may also perform the first operation on the target object in the second page on the second screen, to move or copy the target object into the first page on the first screen.

In the embodiments of the present disclosure, the above mobile terminal may be any device with a storage medium, for example: computer, mobile phone, tablet personal computer, laptop computer, personal digital assistant (PDA), mobile Internet device (MID) or wearable device and other terminal devices.

According to the object management method in this embodiment, when the target object needs to be managed, the user may display the first page and the second page on different screens of the mobile terminal respectively, and perform the first operation on the target object in the first page to move or copy a file and/or a folder in the first page into the second page. In this way, the user does not need to repeatedly switch between different pages during object management, which simplifies operations and improves object management efficiency.

Figure 2:
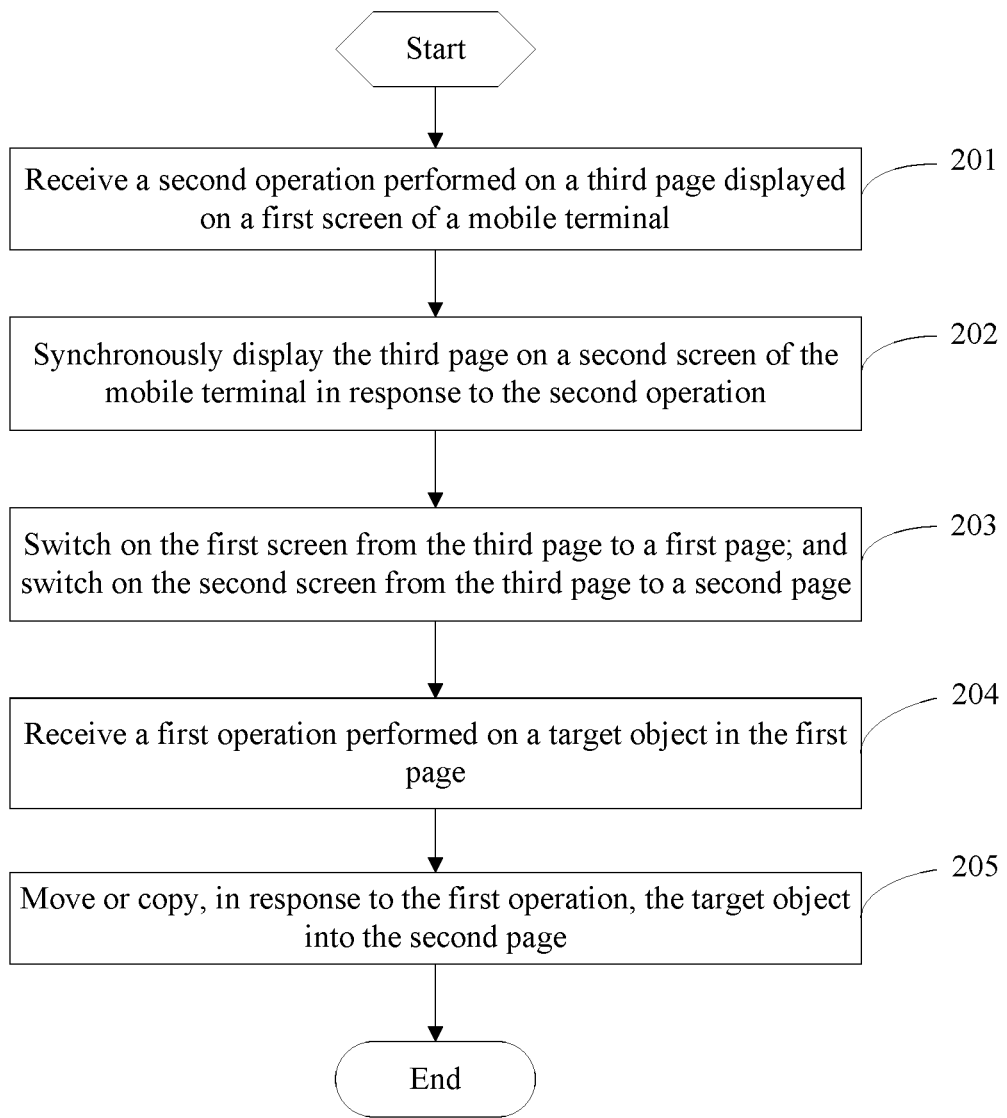
FIG. 2 is a flowchart of another object management method according to an embodiment of the present disclosure.

FIG. 2 is a flowchart of another object management method according to an embodiment of the present disclosure. The method is applied to a mobile terminal. Based on the embodiment shown in FIG. 1, a step of switching between the first page and the second page on the first screen and the second screen respectively is further described in this embodiment, thereby making an object management manner clearer and more specific. As shown in FIG. 2, the method includes the following steps:

Step 201: Receive a second operation performed on a third page displayed on the first screen of the mobile terminal.

When the third page is a desktop icon page, the third page may be a desktop home page, or a desktop page different from the first page and the second page. When the third page is a file-directory page, the third page may be a root-directory page, a parent-directory page or a child-directory page of the first page, or a parent-directory page or a child-directory page of the second page.

The second operation may be an operation used for triggering the third page to be synchronously displayed on the second screen, for example, a touch operation on an on-screen display control on the first screen, or a preset sliding input operation or another touch operation on the third page.

In this embodiment, the third page, for example, the desktop home page or root-directory page, may be opened on the first screen first, and then the second operation may be performed on the third page to enable an on-screen display mode.

Step 202: Synchronously display the third page on the second screen of the mobile terminal in response to the second operation.

After the second operation is received, the third page may be synchronously displayed on the second screen in response to the second operation. In this case, both the first screen and the second screen display the same page. In this way, a user can enter the first page from the third page on the first screen and enter the second page from the third page on the second screen, respectively.

Step 203: Switch on the first screen from the third page to the first page; and switch on the second screen from the third page to the second page.

The switching on the first screen from the third page to the first page may be: switching, based on an input of the user on the first screen, from the third page to the first page expected by the user, for example, sliding from the third page to the first page, tapping a folder in the third page to enter a child-directory page, returning to a parent-directory page, or tapping a folder in the parent-directory page after returning to the parent-directory page.

The switching on the second screen from the third page to the second page may be: switching, based on an input of the user on the second screen, from the third page to the second page expected by the user, for example, sliding from the third page to the second page, taping a folder in the third page to enter a child-directory page, returning to a parent-directory page, or taping a folder in the parent-directory page after returning to the parent-directory page.

It should be noted that, an execution sequence relationship between a step of switching on the first screen from a first directory page to a source-directory page and a step of switching on the second screen from the first directory page to a target-directory page is not limited in this embodiment. In other words, switching on the first screen to the first page may be first performed, and then switching on the second screen to the second page may be performed. Alternatively, switching on the second screen to the second page may be first performed, and then switching on the first screen to the first page may be performed. In addition, switching on the first screen and the second screen to the first page and the second page respectively may be performed simultaneously.

It should further be noted that, in this embodiment, step 201 to step 203 may be replaced. For example, step 201 to step 203 may be respectively replaced as follows:

receiving a third operation performed on a target folder in a fourth page displayed on the first screen;

displaying, on the second screen in response to the third operation, the second page corresponding to the target folder; and switching on the first screen from the fourth page to the first page.

The fourth page is a parent-directory page of the second page, may be a root-directory page, or a parent-directory page or a child-directory page of the first page, and may be the same as or different from the third page.

The third operation may be an operation used for triggering a directory page corresponding to the target folder in the fourth page to be pushed to the second screen for display, for example, an operation of touching the target folder and selecting a push option from pop-up menu options, or an operation of sliding on the target folder towards the second screen.

In this implementation, the fourth page (for example, the root-directory page) may be first opened on the first screen, and the third operation may be subsequently performed on the target folder in the third page, so that the mobile terminal displays, on the second screen in response to the third operation, the second page corresponding to the target folder.

Then, the switching on the first screen from the fourth page to the first page may be specifically: switching, based on an input of the user on the first screen, from the fourth page to the first page expected by the user, for example, taping a folder in the fourth page to enter a child-directory page, returning to a parent-directory page, or taping a folder in the parent-directory page after returning to the parent-directory page.

In this case, this implementation may be: entering from the first screen to a directory page where a folder corresponding to the second page expected by the user is located; directly pushing the second page to the second screen; and switching on the first screen from the fourth page to the first page expected by the user. Therefore, the user needs to perform operations only on the first screen, but does not need to switch on the second screen between directory pages. This makes an object management manner more convenient and faster.

Step 204: Receive a first operation performed on a target object in the first page.

For a specific implementation of this step, refer to an implementation of step 101 in the method embodiment shown in FIG. 1. To avoid repetition, details are not described herein.

Step 205: Move or copy, in response to the first operation, the target object into the second page.

The first page and the second page are different pages.

For a specific implementation of this step, refer to an implementation of step 102 in the method embodiment shown in FIG. 1. To avoid repetition, details are not described herein.

Optionally, step 204 includes:

receiving a first sub-operation of dragging the target object in the first page displayed on the first screen to an edge of the first screen; and step 205 includes:

moving, in response to the first sub-operation, the target object into the second page displayed on the second screen.

In this implementation, the first operation may be the first sub-operation of dragging the target object to the edge of the first screen, that is, the first sub-operation may be an operation of dragging the target object to the edge of the first screen.

After the first sub-operation is received, the target object can be moved, in response to the first sub-operation, into the second page displayed on the second screen, that is, the target object can be moved from the first page on the first screen into the second page on the second screen, and the first page on the first screen does not include the target object any more.

To visually remind the user that a current operation is an operation of moving the target object, during dragging of the target object, a transparent icon of the target object may be displayed separately on the first screen along with a dragging operation of the user, so that the user is reminded that the current operation is a moving management operation.

Therefore, in this implementation, an operation of moving the target object into the second page on the second screen can be implemented only by dragging the target object in the first page to the edge of the first screen, which simplifies the operation.

Of course, this implementation may also be applied to the embodiment shown in FIG. 1, and the same beneficial effect can be achieved.

Optionally, step 204 includes:

receiving a second sub-operation of long pressing the target object in the first page displayed on the first screen and dragging the target object to an edge of the first screen; and step 205 includes:

copying, in response to the second sub-operation, the target object into the second page displayed on second screen.

In this implementation, the first operation may be the second sub-operation of long pressing the target object and dragging the target object to the edge of the first screen, that is, the second sub-operation may be an operation of long pressing the target object and dragging the target object to the edge of the first screen.

After the second sub-operation is received, the target object can be copied, in response to the second sub-operation, into the second page displayed on the second screen, that is, the target object can be copied from the first page on the first screen into the second page on the second screen, and both the first page on the first screen and the second page on the second screen include the target object.

To visually remind the user that a current operation is an operation of copying the target object, a vibration prompt may be output after the target object is long pressed, and an entity icon of the target object that is consistent with an original icon of the target object may be displayed separately. In addition, the separated entity icon may move on the first screen along with dragging of the user, and may remind the user that the current operation is a copying management operation.

Therefore, in this implementation, an operation of copying the target object into the second page on the second screen can be implemented only by long pressing the target object in the first page and dragging the target object to the edge of the first screen, which simplifies and facilitates the operation.

In this embodiment, by switching on the first screen from the third page to the first page, and switching on the second screen from the third page to the second page, the user can directly move or copy the target object in the first page into the second page, without repeatedly switching between directory pages in a moving or copying process.

In addition, according to this embodiment, various optional implementations are added on the basis of the embodiment shown in FIG. 1. These optional implementations may be implemented in combination with each other or may be implemented separately, and the user does not need to switch repeatedly between different directories during object management, thereby achieving technical effects of simple and convenient operations and higher management efficiency.

The object management manner in the embodiments of the present disclosure is described below with reference to FIG. 3a to FIG. 3d by using a double-screen mobile terminal as an example.

Figure 3A:
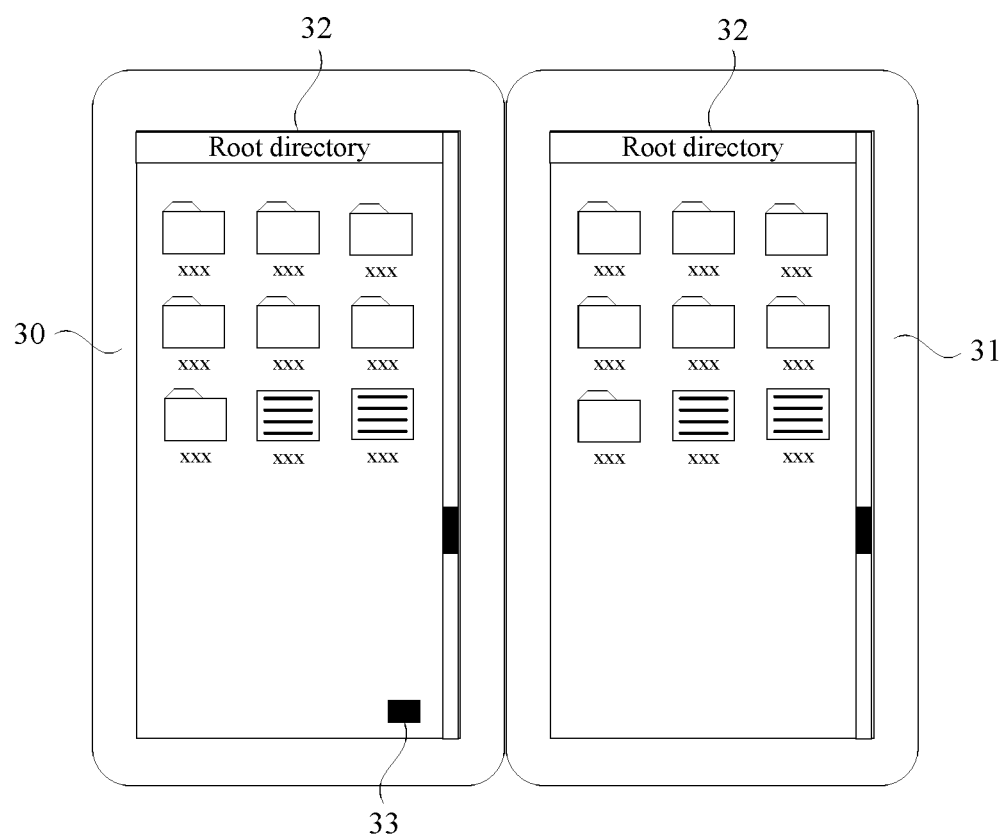
FIG. 3a is a schematic diagram of interfaces of a primary screen and a secondary screen on which a root-directory page is synchronously displayed according to an embodiment of the present disclosure.

As shown in FIG. 3a, a user may first enter a root-directory page 32 for file management from a primary screen 30 of the mobile terminal, where an on-screen display control 33 is displayed on the root-directory page 32; and the user may touch the on-screen display control 33 to enable an on-screen display mode, so that a secondary screen 31 also displays the root-directory page 32.

Figure 3B:
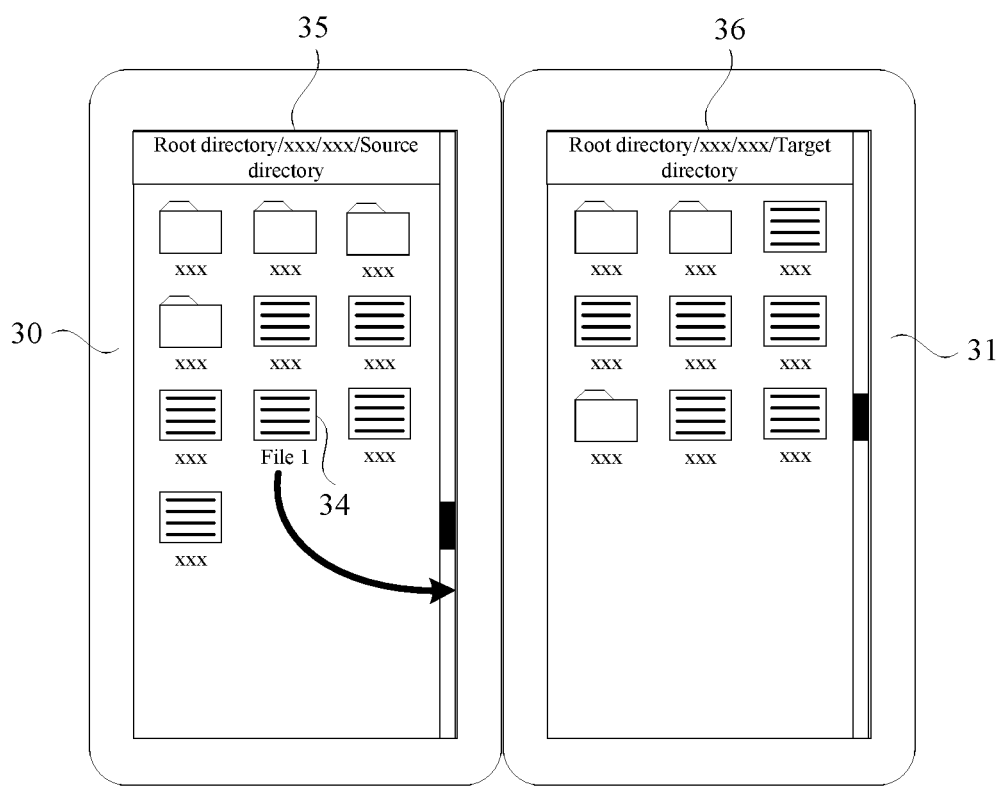
FIG. 3b is a schematic diagram of interfaces of a primary screen and a secondary screen on which a source-directory page and a target-directory page are displayed respectively according to an embodiment of the present disclosure.

As shown in FIG. 3b, the user may enter, on the primary screen 30 from the root-directory page 32, a source-directory page 35 where a to-be-managed target object 34 is located; and enter, on the secondary screen 31 from the root-directory page 32, a target-directory page 36 where the to-be-managed target object 34 is expected to be located.

Figure 3C:
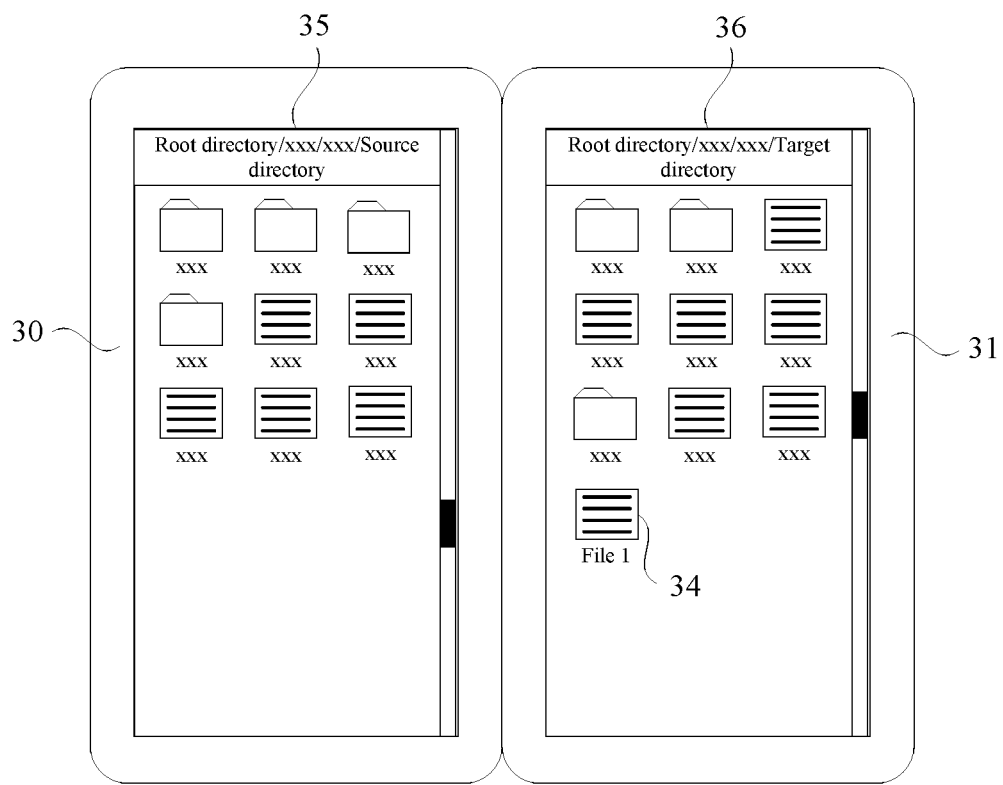
FIG. 3c is a schematic diagram of interfaces of a primary screen and a secondary screen after a target object in a source-directory page is moved into a target-directory page according to an embodiment of the present disclosure.

In an operation manner, the user may drag the target object 34 in the source-directory page 35 displayed on the primary screen 30 while pressing the target object 34. In this case, a transparent icon may be separated from the target object 34 to remind the user that a current operation is a moving management operation. When the user releases the target object 34 after dragging the target object 34 to any edge of the primary screen 30, as shown in FIG. 3c, the target object 34 may disappear from the source-directory page 35, and be displayed in the target-directory page 36.

After moving is completed, the user may continue to move another object in the source-directory page 35 to the target-directory page 36, or switch on the primary screen 30 and/or the secondary screen 31 to another directory page, so that an object in another source-directory page displayed on the primary screen 30 is moved into another target-directory page displayed on the secondary screen 31.

Figure 3D:
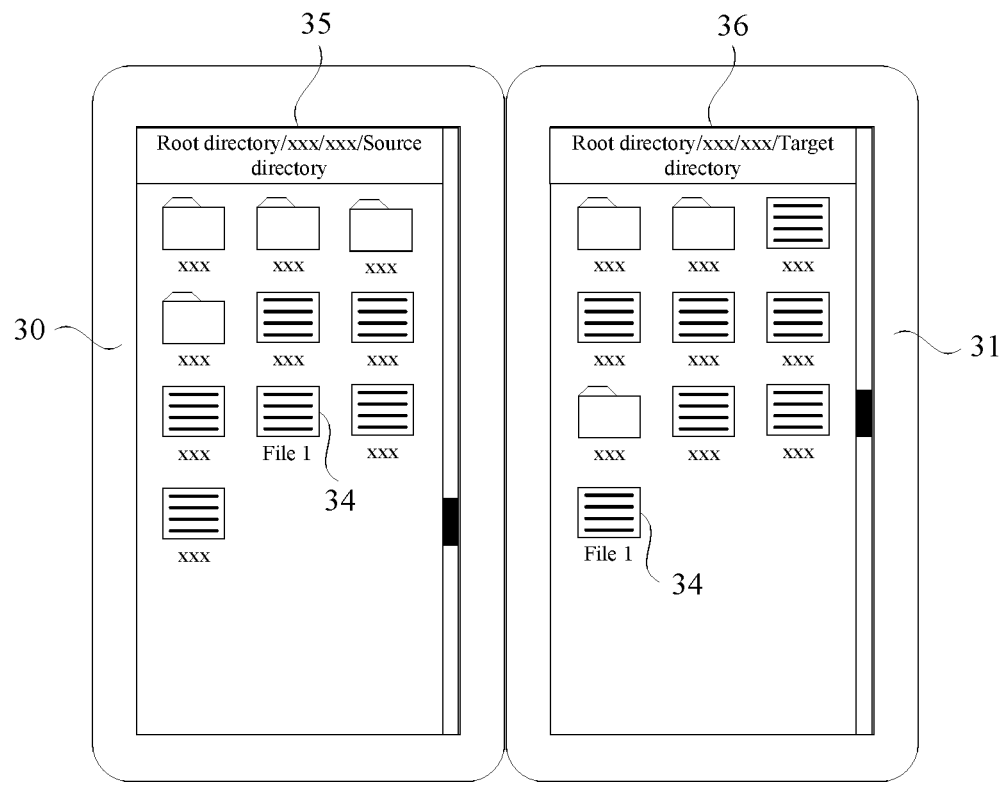
FIG. 3d is a schematic diagram of interfaces of a primary screen and a secondary screen after a target object in a source-directory page is copied into a target-directory page according to an embodiment of the present disclosure.

In another operation manner, the user may long press the target object 34 in the source-directory page 35 displayed on the primary screen 30 till vibration feedback is received. In this case, an entity icon may be separated from the target object 34 to remind the user that a current operation is a copying management operation. Then, the user may release the target object 34 after dragging the target object 34 to any edge of the primary screen 30. As shown in FIG. 3d, the target object 34 is still displayed in the source-directory page 35, and also displayed in the target-directory page 36.

After copying is completed, the user may continue to copy another object in the source-directory page 35 to the target-directory page 36, or switch on the primary screen 30 and/or the secondary screen 31 to another directory page, so that an object in another source-directory page displayed on the primary screen 30 is copied into another target-directory page displayed on the secondary screen 31.

It should be noted that directory pages displayed on the primary screen 30 and the secondary screen 31 may be a source-directory page and a target-directory page for each other, that is, the user can not only move or copy a file and/or a folder in the directory page on the primary screen 30 into the directory page on the secondary screen 31, but also move or copy a file and/or a folder in the directory page on the secondary screen 31 into the directory page on the primary screen 30.

Figure 4:
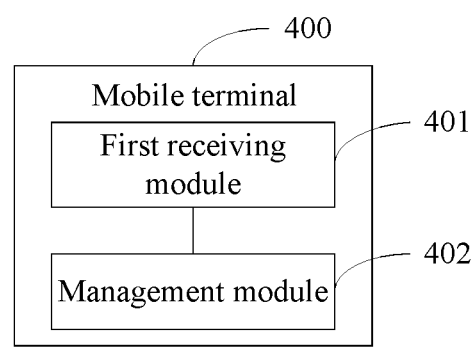
FIG. 4 is a schematic structural diagram of a mobile terminal according to an embodiment of the present disclosure.

FIG. 4 is a schematic structural diagram of a mobile terminal according to an embodiment of the present disclosure. The mobile terminal includes a first screen and a second screen. As shown in FIG. 4, the mobile terminal 400 includes:

a first receiving module 401, configured to receive a first operation performed on a target object in a first page displayed on the first screen, where the target object includes at least one of a file and a folder; and a management module 402, configured to move or copy, in response to the first operation, the target object into a second page displayed on the second screen, where the first page and the second page are different pages.

Optionally, the first page and the second page may be different desktop pages of the mobile terminal or different file-directory pages.

Figure 5:
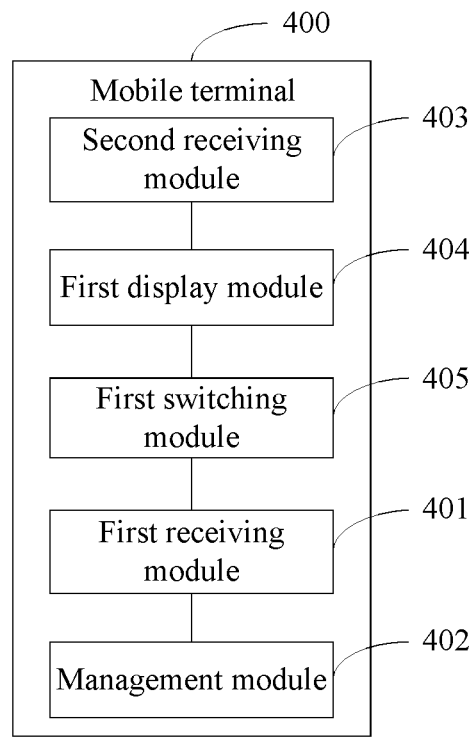
FIG. 5 is a schematic structural diagram of another mobile terminal according to an embodiment of the present disclosure.

Optionally, as shown in FIG. 5, the mobile terminal 400 further includes:

a second receiving module 403, configured to receive a second operation performed on a third page displayed on the first screen;

a first display module 404, configured to synchronously display the third page on the second screen in response to the second operation; and a first switching module 405, configured to switch on the first screen from the third page to the first page; and switch on the second screen from the third page to the second page.

Figure 6:
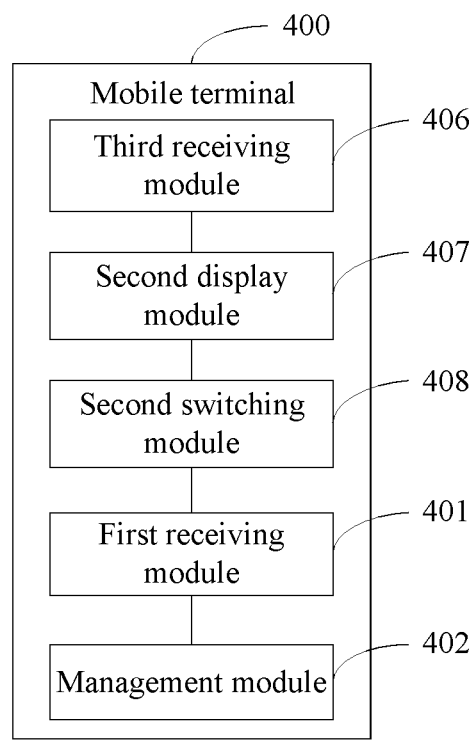
FIG. 6 is a schematic structural diagram of still another mobile terminal according to an embodiment of the present disclosure.

Optionally, as shown in FIG. 6, the mobile terminal 400 further includes:

a third receiving module 406, configured to receive a third operation performed on a target folder in a fourth page displayed on the first screen;

a second display module 407, configured to display, on the second screen in response to the third operation, the second page corresponding to the target folder; and a second switching module 408, configured to switch on the first screen from the fourth page to the first page.

Optionally, the first receiving module 401 is configured to receive a first sub-operation of dragging the target object in the first page displayed on the first screen to an edge of the first screen; and the management module 402 is configured to move, in response to the first sub-operation, the target object into the second page displayed on the second screen.

Optionally, the first receiving module 401 is configured to receive a second sub-operation of long pressing the target object in the first page displayed on the first screen and dragging the target object to an edge of the first screen; and the management module 402 is configured to copy, in response to the second sub-operation, the target object into the second page displayed on the second screen.

The mobile terminal 400 can implement the processes implemented by the mobile terminal in the method embodiments of FIG. 1 to FIG. 3. To avoid repetition, details are not described herein again. According to the mobile terminal 400 in the embodiments of the present disclosure, when the target object needs to be managed, the first page and the second page are displayed on different screens of the mobile terminal respectively, and the first operation on the target object in the first page is received, so that the target object is moved or copied into the second page. In this way, the user does not need to repeatedly switch between different pages during object management, thereby achieving advantages of simple and convenient operations and higher management efficiency.

Figure 7:
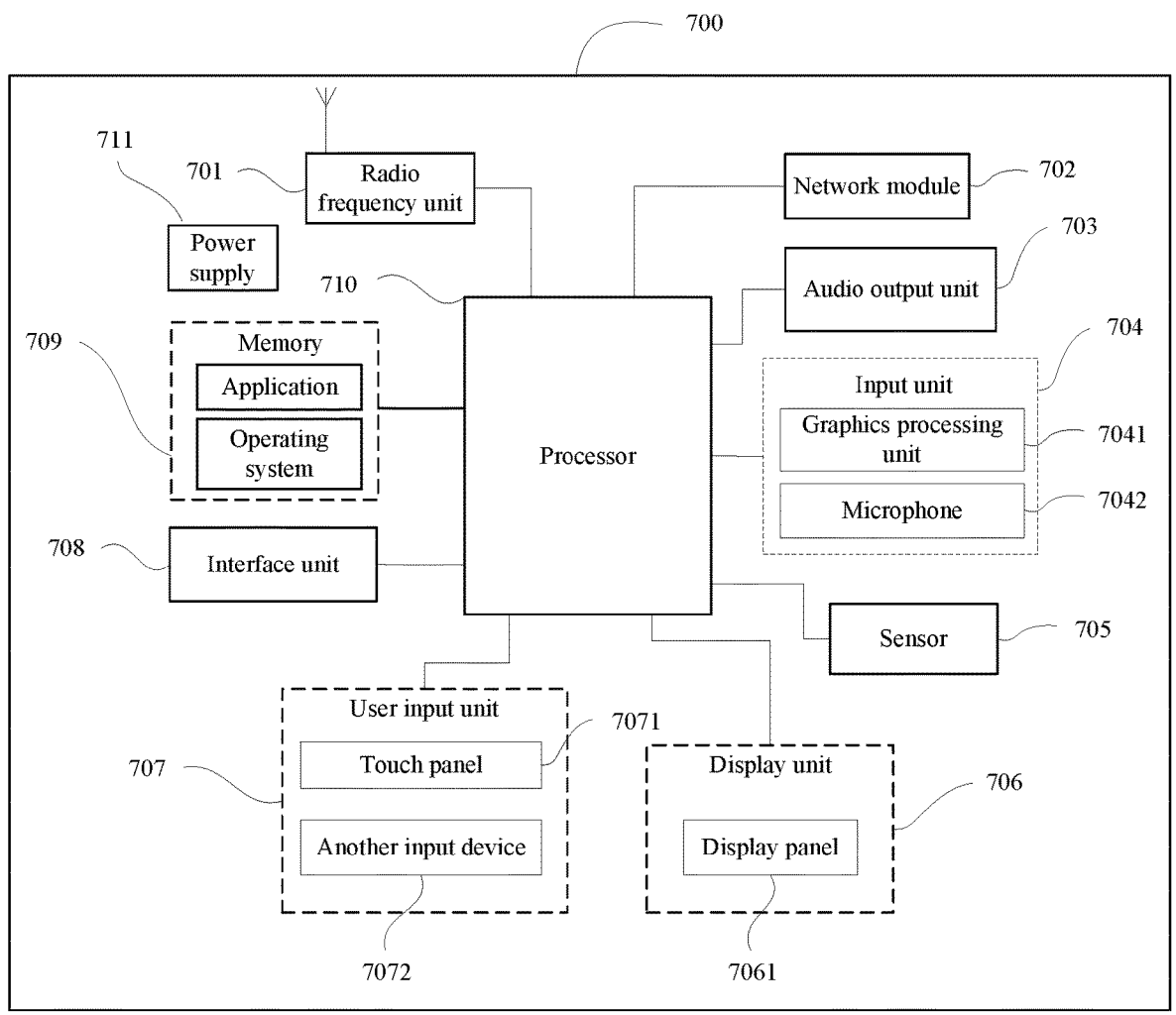
FIG. 7 is a schematic diagram of a hardware structure of a mobile terminal according to an embodiment of the present disclosure.

FIG. 7 is a schematic diagram of a hardware structure of a mobile terminal implementing embodiments of the present disclosure. The mobile terminal includes a first screen and a second screen. The mobile terminal 700 includes, but is not limited to: a radio frequency unit 701, a network module 702, an audio output unit 703, an input unit 704, a sensor 705, a display unit 706, a user input unit 707, an interface unit 708, a memory 709, a processor 710, a power supply 711, and other components. A person skilled in the art may understand that the structure of the mobile terminal shown in FIG. 7 constitutes no limitation on the mobile terminal, and the mobile terminal may include more or fewer parts than those shown in the figure, or combine some parts, or have a different part arrangement. In this embodiment of the present disclosure, the mobile terminal includes but is not limited to a mobile phone, a tablet computer, a laptop computer, a palmtop computer, an in-vehicle terminal, a wearable device, a pedometer, and the like.

The processor 710 is configured to receive a first operation performed on a target object in a first page displayed on first screen; and move or copy, in response to the first operation, the target object into a second page displayed on second screen, where the first page and the second page are different directory pages.

Optionally, the first page and the second page may be different desktop pages of the mobile terminal or different file-directory pages.

Optionally, the processor 710 is further configured to:
receive a second operation performed on a third page displayed on the first screen;
synchronously display the third page on the second screen in response to the second operation;
switch on the first screen from the third page to the first page; and
switch on the second screen from the third page to the second page.

Optionally, the processor 710 is further configured to:
receive a third operation performed on a target folder in a fourth page displayed on the first screen;
display, on the second screen in response to the third operation, the second page corresponding to the target folder; and
switching on the first screen from the fourth page to the first page.

Optionally, the processor 710 is further configured to:
receive a first sub-operation of dragging the target object in the first page displayed on the first screen to an edge of the first screen; and
move, in response to the first sub-operation, the target object into the second page displayed on the second screen.

Optionally, the processor 710 is further configured to:
receive a second sub-operation of long pressing the target object in the first page displayed on the first screen and dragging the target object to an edge of the first screen; and
copy, in response to the second sub-operation, the target object into the second page displayed on second screen.

The mobile terminal 700 can implement each process implemented by the mobile terminal in the foregoing embodiments. To avoid repetition, details are not described herein again. According to the mobile terminal 700 in the embodiments of the present disclosure, when the target object needs to be managed, the first page and the second page are displayed on different screens of the mobile terminal respectively, and the first operation on the target object in the first page is received, so that the target object is moved or copied into the second page. In this way, the user does not need to repeatedly switch between different pages during object management, thereby achieving advantages of simple and convenient operations and higher management efficiency.

It should be understood that, in this embodiment of the present disclosure, the radio frequency unit 701 may be configured to receive and transmit information, or receive and transmit signals during a call. Specifically, the radio frequency unit 701 receives downlink data from a base station, and transmits the downlink data to the processor 710 for processing; and in addition, transmits uplink data to the base station. Usually, the radio frequency unit 701 includes, but not limited to, an antenna, at least one amplifier, a transceiver, a coupler, a low noise amplifier, and a duplexer. In addition, the radio frequency unit 701 further may communicate with other devices through a wireless communication system and a network.

The mobile terminal provides wireless broadband Internet access for a user by using the network module 702, for example, helping the user send and receive an email, browse a web page, and access streaming media.

The audio output unit 703 may convert audio data received by the radio frequency unit 701 or the network module 702 or stored in the memory 709 into an audio signal and output the audio signal as sound. In addition, the audio output unit 703 may further provide audio output (for example, a call signal received voice, or a message received voice) related to a specific function executed by the mobile terminal 700. The audio output unit 703 includes a speaker, a buzzer, a telephone receiver, and the like.

The input unit 704 is configured to receive audio or video signals. The input unit 704 may include a graphics processing unit (GPU) 7041 and a microphone 7042. The graphics processing unit 7041 processes image data of a static image or video obtained by an image capture apparatus (such as, a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive a sound and can process such sound into audio data. The processed audio data may be converted into a format output which is sent to a mobile communication base station by the radio frequency unit 701 under a telephone conversation mode.

The mobile terminal 700 may further include at least one sensor 705 such as an optical sensor, a motion sensor, or another sensor. Specifically, the optional sensor includes an ambient light sensor and a proximity sensor. The ambient light sensor may adjust luminance of the display panel 7061 based on brightness of ambient light, and the proximity sensor may disable the display panel 7061 and/or backlight when the mobile terminal 700 approaches an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information entered by a user or information provided for a user. The display unit 706 may include the display panel 7061, and the display panel 7061 may be configured in a form of a liquid crystal display (LCD), an organic light-emitting diode (OLED), or the like.

The user input unit 707 may be configured to receive inputted digit or character information and generate key signal input related to user setting and function control of the mobile terminal. Specifically, the user input unit 707 includes a touch panel 7071 and another input device 7072. The touch panel 7071 is also referred to as a touchscreen, and may collect a touch operation performed by a user on or near the touch panel 7071 (such as an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 710, and can receive and execute a command sent by the processor 710. In addition, the touch panel 7071 may be achieved by a variety of types, such as a resistance type, a capacitance type, an infrared ray and a surface acoustic wave. In addition to the touch panel 7071, the user input unit 707 may further include other input devices 7072. Specifically, the another input device 7072 may include but is not limited to one or more of a physical keyboard, a function key (such as a volume control key or an on/off key), a trackball, a mouse, a joystick, and the like. Details are not described herein again.

Further, the touch panel 7071 may cover the display panel 7061. When detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, although the touch panel 7071 and the display panel 7061 are used as two independent parts to implement input and input functions of the mobile terminal, in some embodiments, the touch panel 7071 and the display panel 7061 may be integrated to implement the input and output functions of the mobile terminal. This is not specifically limited herein.

The interface unit 708 is an interface connecting an external apparatus to the mobile terminal 700. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 708 may be configured to receive input (for example, data information and power) from the external apparatus and transmit the received input to one or more elements in the mobile terminal 700, or may be configured to transmit data between the mobile terminal 700 and the external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 709 may include a high-speed random access memory, further include a nonvolatile memory, for example, at least one disk storage device, a flash memory or other volatile solid storage devices.

The processor 710 is a control center of the mobile terminal, and is connected to all parts of the entire mobile terminal by using various interfaces and lines, and performs various functions of the mobile terminal and processes data by running or executing the software program and/or the module that are/is stored in the memory 709 and invoking the data stored in the memory 709, to implement overall monitoring on the mobile terminal. The processor 710 may include one or more processing units. Optionally, the processor 710 may be integrated with an application processor and a modem processor. The application processor mainly processes an operating system, a user interface, an application program, and the like, and the modem processor mainly processes wireless communication. It should be understood that the modem processor may be not integrated in the processor 710.

The mobile terminal 700 may further include a power supply 711 (such as a battery) that supplies power to each component. Optionally, the power supply 711 may be logically connected to the processor 710 by using a power supply management system, to implement functions such as charging, discharging, and power consumption management by using the power supply management system.

In addition, the mobile terminal 700 includes some functional modules not shown, and details are not described herein again.

Optionally, an embodiment of the present disclosure further provides a mobile terminal, including a first screen and a second screen. The mobile terminal includes a processor 710, a memory 709, and a computer program that is stored in the memory 709 and that can run on the processor 710. When the computer program is executed by the processor 710, processes of the foregoing object management method embodiment are implemented, and a same technical effect can be achieved. To avoid repetition, details are not described herein again.

An embodiment of the present disclosure further provides a computer-readable storage medium. A computer program is stored in the computer-readable storage medium. When being executed by a processor, the computer program implements each process of the foregoing object management method embodiments, and a same technical effect can be achieved. To avoid repetition, details are not described herein. The computer-readable storage medium is, for example, a read-only memory (ROM), a random access memory (RAM), a magnetic disk, or an optical disc.

It should be noted that in this specification, the terms "include", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. In the absence of more limitations, an element defined by "including a . . . " does not preclude the existence of other identical elements in the process, method, article, or device that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, namely, may be located in one location, or may be distributed on a plurality of network units. Some or all of the units may be selected according to actual needs to achieve the objective of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer-readable storage medium. Based on such an understanding, the technical solutions of the present disclosure essentially, or the part contributing to the related art, or some of the technical solutions may be implemented in a form of a software product. The computer software product is stored in a storage medium, and includes several instructions for enabling a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

A person of ordinary skill in the art can understand that all or some of the procedures in the methods of the foregoing embodiments may be implemented by a computer program controlling related hardware. The program may be stored in a computer-readable storage medium. When the program is executed, the procedures of the embodiments of the foregoing methods may be performed. The foregoing storage medium may be a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For implementation with hardware, the processing unit may be implemented in one or more application specific integrated circuits (ASIC), a digital signal processor (DSP), a digital signal processing device (DSP Device, DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing functional modules (for example, a process and a function) in the embodiments of the present disclosure. Software code can be stored in the memory and executed by the processor. The memory can be implemented inside or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. An object management method, applied to a mobile terminal, wherein the mobile terminal comprises a first screen and a second screen, and the method comprises:
    receiving a first operation performed on a target object in a first page displayed on the first screen; and
    moving or copying, in response to the first operation, the target object into a second page displayed on the second screen, wherein
    the first page and the second page are different pages, the first page and the second page are different desktop pages of the mobile terminal or different file-directory pages, and the first screen and the second screen are different screens,
    wherein before the receiving the first operation performed on the target object in the first page displayed on the first screen, the method further comprises:
        receiving one second operation performed on a third page displayed on the first screen wherein the one second operation is a touch operation on an on-screen display control on the first screen, or a preset touch operation on the third page on the first screen, and the third page is a desktop home page or a root-directory page;
        synchronously displaying the third page on the first screen and the second screen in response to the second operation;
        switching on the first screen from the third page to the first page; and
        switching on the second screen from the third page to the second page.

2. The method according to claim 1, wherein before the receiving the first operation performed on the target object in the first page displayed on the first screen, the method further comprises:
    receiving a third operation performed on a target folder in a fourth page displayed on the first screen;
    displaying, on the second screen in response to the third operation, the second page corresponding to the target folder; and
    switching on the first screen from the fourth page to the first page.

3. The method according to claim 1, wherein the receiving the first operation performed on the target object in the first page displayed on the first screen comprises:
    receiving a first sub-operation of dragging the target object in the first page displayed on the first screen to an edge of the first screen; and
    the moving or copying, in response to the first operation, the target object into a second page displayed on the second screen comprises:
        moving, in response to the first sub-operation, the target object into the second page displayed on the second screen, wherein the first page displayed on the first screen does not comprise the target object after the target object has been moved.

4. The method according to claim 3, wherein the moving, in response to the first sub-operation, the target object into the second page displayed on the second screen comprises:
    displaying a transparent icon of the target object separately on the first screen along with the first sub-operation.

5. The method according to claim 1, wherein the receiving the first operation performed on the target object in the first page displayed on the first screen comprises:
    receiving a second sub-operation of long pressing the target object in the first page displayed on the first screen and dragging the target object to an edge of the first screen; and
    the moving or copying, in response to the first operation, the target object into a second page displayed on the second screen comprises:
        copying, in response to the second sub-operation, the target object into the second page displayed on the second screen.

6. The method according to claim 5, wherein the copying, in response to the second sub-operation, the target object into the second page displayed on the second screen comprises:
    outputting a vibration prompt and displaying an entity icon of the target object separately on the first screen after the target object is long pressed; and
    separating the entity icon of the target object from an original icon of the target object, and moving the separated entity icon on the first screen along with dragging,
    wherein the entity icon of the target object is consistent with the original icon of the target object.

7. The method according to claim 1, wherein the first page is a source-directory page, and the second page is a target-directory page.

8. The method according to claim 1, wherein when the third page is a desktop icon page, the third page is a desktop home page;
    when the third page is a file-directory page, the third page is a root-directory page, a parent-directory page or a child-directory page of the first page, or a parent-directory page or a child-directory page of the second page.

9. A mobile terminal, comprising a first screen and a second screen, and further comprising: a processor, a memory, and a computer program that is stored in the memory and that can be run on the processor, wherein when the computer program is executed by the processor, following steps are implemented:
    receiving a first operation performed on a target object in a first page displayed on the first screen; and
    moving or copying, in response to the first operation, the target object into a second page displayed on the second screen, wherein
    the first page and the second page are different pages, the first page and the second page are different desktop pages of the mobile terminal or different file-directory pages, and the first screen and the second screen are different screens, wherein before the receiving the first operation performed on the target object in the first page displayed on the first screen, the processor is configured to perform the following steps:

receiving one second operation performed on a third page displayed on the first screen wherein the one second operation is a touch operation on an on-screen display control on the first screen, or a preset touch operation on the third page on the first screen, and the third page is a desktop home page or a root-directory page;

synchronously displaying the third page on the first screen and the second screen in response to the second operation;

switching on the first screen from the third page to the first page; and switching on the second screen from the third page to the second page.

10. The mobile terminal according to claim 9, wherein before the receiving the first operation performed on the target object in the first page displayed on the first screen, when the computer program is executed by the processor, following steps are further implemented:

receiving a third operation performed on a target folder in a fourth page displayed on the first screen;

displaying, on the second screen in response to the third operation, the second page corresponding to the target folder; and switching on the first screen from the fourth page to the first page.

11. The mobile terminal according to claim 9, wherein the receiving the first operation performed on the target object in the first page displayed on the first screen comprises:

receiving a first sub-operation of dragging the target object in the first page displayed on the first screen to an edge of the first screen; and the moving or copying, in response to the first operation, the target object into a second page displayed on the second screen comprises:

moving, in response to the first sub-operation, the target object into the second page displayed on the second screen, wherein the first page displayed on the first screen does not comprise the target object after the target object has been moved.

12. The mobile terminal according to claim 9, wherein the receiving the first operation performed on the target object in the first page displayed on the first screen comprises:

receiving a second sub-operation of long pressing the target object in the first page displayed on the first screen and dragging the target object to an edge of the first screen; and the moving or copying, in response to the first operation, the target object into a second page displayed on the second screen comprises:

copying, in response to the second sub-operation, the target object into the second page displayed on the second screen.

13. The mobile terminal according to claim 9, wherein when the third page is a desktop icon page, the third page is a desktop home page;

when the third page is a file-directory page, the third page is a root-directory page, a parent-directory page or a child-directory page of the first page, or a parent-directory page or a child-directory page of the second page.

14. A non-transitory computer-readable storage medium, storing a computer program, wherein when the computer program is executed by a processor, following steps are implemented:

receiving a first operation performed on a target object in a first page displayed on a first screen; and moving or copying, in response to the first operation, the target object into a second page displayed on a second screen, wherein the first page and the second page are different pages, the first page and the second page are different desktop pages of a mobile terminal or different file-directory pages, and the first screen and the second screen are different screens, wherein before the receiving the first operation performed on the target object in the first page displayed on the first screen, the computer program causes the processor to perform the following steps:

receiving one second operation performed on a third page displayed on the first screen wherein the one second operation is a touch operation on an on-screen display control on the first screen, or a preset touch operation on the third page on the first screen, and the third page is a desktop home page or a root-directory page;

synchronously displaying the third page on the first screen and the second screen in response to the second operation;

switching on the first screen from the third page to the first page; and switching on the second screen from the third page to the second page.

15. The computer-readable storage medium according to claim 14, wherein before the receiving the first operation performed on the target object in the first page displayed on the first screen, when the computer program is executed by the processor, following steps are further implemented:

receiving a third operation performed on a target folder in a fourth page displayed on the first screen;

displaying, on the second screen in response to the third operation, the second page corresponding to the target folder; and switching on the first screen from the fourth page to the first page.

16. The computer-readable storage medium according to claim 14, wherein the receiving the first operation performed on the target object in the first page displayed on the first screen comprises:

receiving a first sub-operation of dragging the target object in the first page displayed on the first screen to an edge of the first screen; and the moving or copying, in response to the first operation, the target object into a second page displayed on the second screen comprises:

moving, in response to the first sub-operation, the target object into the second page displayed on the second screen, wherein the first page displayed on the first screen does not comprise the target object after the target object has been moved.

17. The computer-readable storage medium according to claim 14, wherein the receiving the first operation performed on the target object in the first page displayed on the first screen comprises:

receiving a second sub-operation of long pressing the target object in the first page displayed on the first screen and dragging the target object to an edge of the first screen; and the moving or copying, in response to the first operation, the target object into a second page displayed on the second screen comprises:

copying, in response to the second sub-operation, the target object into the second page displayed on the second screen.

18. The computer-readable storage medium according to claim 14, wherein when the third page is a desktop icon page, the third page is a desktop home page;

when the third page is a file-directory page, the third page is a root-directory page, a parent-directory page or a child-directory page of the first page, or a parent-directory page or a child-directory page of the second page.

\* \* \* \* \*